United States Patent
Addiego et al.

(10) Patent No.: US 6,964,756 B2
(45) Date of Patent: Nov. 15, 2005

(54) METHOD FOR TREATING ALUMINA HONEYCOMB MONOLITHS

(75) Inventors: William P. Addiego, Big Flats, NY (US); Kevin R. Brundage, Corning, NY (US); Christopher R. Glose, Painted Post, NY (US); Jennifer M. Torns, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 360 days.

(21) Appl. No.: 10/315,825

(22) Filed: Dec. 10, 2002

(65) Prior Publication Data

US 2004/0110635 A1  Jun. 10, 2004

(51) Int. Cl.$^7$ ............................ B01J 21/04; B01J 33/00
(52) U.S. Cl. ...................... 423/628; 423/625; 502/414; 502/415; 502/439; 501/127; 501/153
(58) Field of Search ..................... 428/116; 423/628, 423/625; 502/414, 415, 439; 501/153, 127; 264/630

(56) References Cited

U.S. PATENT DOCUMENTS

| | | | | |
|---|---|---|---|---|
| 4,444,899 A | * | 4/1984 | Yamada et al. | 502/64 |
| 4,631,267 A | | 12/1986 | Lachman et al. | 502/439 |
| 4,965,243 A | | 10/1990 | Yamada et al. | 502/304 |
| 5,384,300 A | * | 1/1995 | Feeley et al. | 502/252 |
| 6,365,259 B1 | | 4/2002 | Brundage et al. | 428/116 |
| 6,383,443 B1 | * | 5/2002 | Jeng et al. | 264/621 |

FOREIGN PATENT DOCUMENTS

JP  06154598  *  6/1994

* cited by examiner

Primary Examiner—Stanley S. Silverman
Assistant Examiner—Peter J. Lish
(74) Attorney, Agent, or Firm—Kees van der Sterre

(57) ABSTRACT

High-surface-area alumina honeycombs are subjected to a water vapor pre-treatment to obtain protection from cracking damage on subsequent exposure to aqueous media e.g., aqueous solutions for depositing catalysts on the honeycombs.

4 Claims, No Drawings

METHOD FOR TREATING ALUMINA HONEYCOMB MONOLITHS

BACKGROUND OF THE INVENTION

The present invention relates to methods of fabricating structured catalyst monoliths and, more particularly, to methods for processing structured catalyst supports of alumina composition to deposit active catalytic materials on the surfaces of the supports.

Currently a wide variety of pellet-type catalyst structures formed of gamma alumina or other oxides, e.g., pellets, pills, beads, rings, trilobes, stars or the like are used as catalysts or catalyst supports in the petrochemical industry. These structures are typically formed by extrusion from batch mixtures of alumina or other selected oxides, followed by drying and calcining. The objective is to produce shapes which are crush- and attrition-resistant when packed into reactor beds.

Although technologies for making durable, active pellet-type alumina supports or catalysts are well developed, such structures are not optimally configured for most catalytic reactor applications. Pellet beds tend to exhibit relatively high flow resistance in comparison with honeycomb supports, and also develop preferential flow paths which exhaust portions of the catalyst while leaving other portions relatively unused.

Some of these problems have been addressed, particularly for gas-phase reactions, through the adoption of ceramic honeycombs as physical structural supports for chemically active, high-surface-area catalysts or catalyst support coatings. U.S. Pat. No. 4,965,243, for example, describes coated honeycomb support structures provided with high-surface-area washcoatings of gamma-alumina supporting metal catalysts for the treatment of automobile exhaust gases.

However, there are a number of applications for which porous washcoatings are inadequate from the standpoint of durability and/or catalyst loading capacity, and for those applications catalysts or catalyst supports made up mostly or entirely of active, high-surface-area material must instead be used. Such applications include chemical processes wherein the kinetics of the chemical reaction(s) on the catalyst are slow relative to the diffusion and mass transfer steps involved in the overall process.

An example of such an application is the hydro-desulfurization of fossil fuels in the petrochemical industry to make low sulfur gasoline and diesel fuels. Since the reaction kinetics are the slow step in such processes, it is important to provide a relatively large accessible BET catalyst support surface (more catalyst sites in a given volume) in order to allow the most effective use of reactor volume. This in turn requires that the entire volume of the catalyst or catalyst support structure be made of active, high-surface-area material, and that the pore structure of the material be such that that the reactants can diffuse in and products diffuse out of the volume of the catalyst support effectively over relatively long distances. Examples of alumina honeycombs that can be useful in such applications are disclosed in U.S. Pat. Nos. 4,631,267 and 6,365,259.

Alumina honeycombs such as described in these patents can be relatively large in comparison to conventional bead or pellet catalyst supports. For physical durability, therefore, a premium is placed on developing high strength as well as high surface area in the finished alumina honeycomb product. However, owing to that high surface area, which in many cases includes a high degree of mesoporosity, extruded alumina monoliths can adsorb large amounts of water. This creates a susceptibility to cracking when the alumina surface is first highly dehydrated, and then subjected to aqueous vapors or solutions.

This susceptibility to cracking is particularly problematic in cases where it is necessary to deposit additional catalytic materials onto the channel wall surfaces of the honeycombs. Typically, both pelletized and monolithic γ-alumina catalyst supports are catalyzed by impregnation with aqueous solutions of catalyst salts in order to develop the desired concentration of catalysts on the supports. This process normally effects the complete wetting of the alumina surface and the filling of the pores of the alumina honeycomb walls with catalyst solution.

In the case of alumina honeycombs, it has been found that the extrusion, drying, and calcination steps typically involved in the production of high-surface-area alumina honeycombs creates highly dehydrated external and internal surfaces. In this state, water adsorption onto the alumina surface and/or water intrusion into the pore structure of the honeycomb walls are particularly rapid and complete. Even physical absorption of water from the vapor phase into the highly porous material can be significant.

As a consequence of this honeycomb characteristic, during the impregnation of alumina honeycombs with aqueous solutions of catalyst precursor salts, immersing a very well dried, water deficient honeycomb causes rapid adsorption of water into the pore structure of the ceramic. In addition, surface hydroxyl groups form from the wetting and from dissociative adsorption of water onto the alumina during chemisorption.

Such water adsorption does not create catastrophic mechanical loss in the case of alumina pellets, beads or other small catalyst support shapes. This is attributed to the small size and substantial cross-sectional thickness of such shapes which enables them to withstand or accommodate the filling and swelling of the pore structure. Particles and beads are also able to withstand other structural changes as well as localized exothermic effects of water absorption.

In the case of highly dehydrated alumina honeycombs or other thin-walled monoliths, and especially in the case of dehydrated honeycombs formed of transition aluminas such as gamma-alumina, however, cracking can easily occur during exposure to these aqueous solutions. This is due not only to the high mesoporosity and high surface area of these honeycombs, but also because of a relatively inflexible geometric structure consisting largely of a matrix of relatively thin, brittle ceramic walls. Apparently the dimensional changes that can occur as a consequence of such treatments, e.g., impregnating the honeycombs with a catalyst solution or otherwise contacting the honeycombs with water, can initiate structural cracking of the monoliths at a level that can in many cases significantly reduce the strength and/or physical durability of the honeycombs.

SUMMARY OF THE INVENTION

The present invention provides a method for protecting alumina honeycombs from cracking on exposure to liquid water-containing solutions or suspensions of catalysts or other honeycomb coating constituents. Included is a method for catalyzing monolithic alumina catalysts or catalyst supports such as alumina honeycombs that permits the use of substantially any water-based medium to deposit any of a wide variety of catalysts or catalyst constituents without risking degradation of the strength or structural integrity of the catalyzed honeycombs.

The methods of the invention are derived in part from the surprising discovery that relatively small amounts of adsorbed water species within the channel structure of dried or calcined alumina honeycombs can suppress or eliminate later liquid-water-induced defect formation in such honeycombs. Such methods are especially effective to protect alumina honeycombs with highly active surfaces, such as honeycombs of gamma alumina or other high-surface-area transition aluminas, from cracking damage.

In a first aspect, therefore, the invention includes method for protecting a calcined or other dehydrated alumina honeycomb from damage through liquid water contact which comprises preliminarily exposing the honeycomb to water vapor. This preliminary water vapor exposure will be at a temperature and for a time sufficient to develop a crack-inhibiting deposit of adsorbed water within the pore structure of the honeycomb prior to contacting the honeycomb with a medium containing liquid water.

In a second aspect the invention includes a method for treating an alumina honeycomb with an aqueous medium to disperse a catalyst constituent on the interior channel surfaces and/or within the internal channel wall pore structure of the selected honeycomb. That method comprises, first, exposing the honeycomb to water vapor for a time sufficient to develop a crack-inhibiting deposit of adsorbed water within the pore structure of the honeycomb. Thereafter, the honeycomb is contacted with an aqueous liquid medium containing one or more catalysts or catalyst constituents, this subsequent liquid contact being carried out in any convenient fashion as appropriate to the selected catalyst, without any need for additional precautions to protect the alumina honeycomb from water damage.

Other aspects of the invention will become apparent from the following detailed description thereof.

DETAILED DESCRIPTION

Generally speaking, alumina honeycombs with a high surface area (i.e., surface areas in excess of 100 $m^2/g$) that are exposed to a humid atmosphere will pick up water vapor without liquid condensation within the pores, gaining mass. The mass gain from water adsorption will depend on the extent of alumina hydration before exposure to the humid atmosphere. While the mechanism of protection provided in accordance with the invention is not completely clear, it has been found that approaching an equilibrium level of adsorbed water on channel wall surfaces of high-surface-area honeycombs, prior to immersing the honeycombs into aqueous solutions containing e.g., catalyst precursor salts, can completely eliminate the cracking that occurs in the absence of vapor pre-treatments.

The methods of the invention extend to the protection of any of a variety of calcined, or otherwise substantially water-free, alumina honeycombs that must be exposed to aqueous media for purposes such as catalyst application. In the same way, protection is also obtained for other treatments involving contact of the honeycomb with aqueous liquids. Examples of such treatments include preliminary liquid treatments to render the honeycombs more suitable for subsequent catalyst deposition, or to modify honeycomb wall porosity for purposes such as enhancing honeycomb adsorption or filtration characteristics.

Aqueous solutions or suspensions that are presently used for the purpose of catalyst deposition may include directly active catalyst species, precursor compounds of such species, and/or precursor constituents intended to react with other constituents previously or subsequently applied to the honeycombs to develop catalyst species in situ on or within the porous wall structure of the honeycombs. Familiar examples of conventional catalyzation processes for channeled honeycomb structures include impregnating with a liquid phase catalyst precursor, coating with a suspended catalyst slurry, or impregnating the surfaces of the channels or spaces with a catalyzing solution of a solid catalyst or catalyst precursor compound. The liquid media employed for these purposes may comprise water alone, or water in combination with other miscible or immiscible liquids in the liquid phase.

The method of exposing a selected honeycomb to water vapor is not critical, although conditions leading to early liquid water condensation on honeycomb surfaces should be avoided. In general, exposure to humid air atmospheres at modestly elevated temperatures can develop the required crack-inhibiting deposit of adsorbed water on and within channel wall surfaces of the honeycombs within a matter of hours. Exposure to moist air atmospheres at temperatures in the 25–100° C. range and at relative humidities of 50% or above, more typically 75–80% or above, will be found to be suitable in the majority of cases.

The determination of relative humidity levels, treating temperatures, and treatment times sufficient to develop the required crack-inhibiting deposit of adsorbed water within the honeycomb structure for each individual case can readily be determined by routine experiment. Conditions may depend on variables such as the particular composition and hydration state of the selected honeycombs, or on the specific aqueous liquid treating materials and treatment processes required after the vapor treatment to prepare the alumina honeycombs for later use.

A routine method for ascertaining the optimal vapor treatment in each case is simply to prepare a series of honeycombs subjected to a range of different water vapor pre-treatments, and then to evaluate the extent of post-liquid-contact cracking exhibited by the honeycombs in the series after exposure to the aqueous solution to be used for catalyst deposition or the like. Treatment times are generally not critical, in part because lengthy honeycomb exposures to water vapor are found not to be particularly harmful in terms of crack-inhibiting benefits. For example, one effective method achieving an effective pre-hydration of a calcined honeycomb is simply to expose the honeycomb to water vapor until vapor adsorption stops, i.e., until the honeycomb is brought into weight equilibrium in the moist vapor-treating environment.

The invention may be further understood by reference to the following comparative and specific examples thereof, which are intended to be illustrative rather than limiting.

For the purpose of evaluating crack-inhibiting vapor treatments for calcined alumina honeycombs, a number of high-surface-area γ-alumina honeycomb monoliths of square-celled honeycomb design are first provided. These honeycombs have a cell density of 100 cells/inch of honeycomb cross-section and a channel wall thickness of about 0.025 inches. They are extruded from a plasticized extrusion batch comprising fine transition alumina powders, a methyl cellulose temporary binder, water and acetic acid to produce green honeycombs which are slowly dried over a period of days, and then fired to obtain partial sintering and strong, high-surface-area alumina honeycombs. Firing to peak temperatures of 600° C. for 4 hours is effective to produce calcined alumina honeycombs that are substantially water-free.

Calcined alumina honeycombs such as above described are quite prone to cracking if immersed in water or aqueous catalyst precursor solutions. For example, immediate and audible cracking of calcined alumina honeycombs of 4-inch diameter is found to occur upon either rapid or gradual immersion in water or an aqueous acidic solution of cobalt carbonate, ammonium heptamolybdate, and phosphoric acid, a solution designed for depositing a cobalt-molybdenum catalyst on the honeycomb.

EXAMPLE 1

To evaluate the effectiveness of water vapor pre-treatments to protect calcined alumina honeycombs from cracking in the presence of water, a gamma-alumina honeycomb produced as above described is preliminarily exposed to an air atmosphere of 90% relative humidity at a temperature of 30° C. for a time of 30 minutes. Following exposure to this vapor treatment the honeycomb is cooled to ambient temperature and examined.

This vapor treatment is found to be effective to achieve substantial solid-vapor equilibrium in the pore and channel surfaces of the honeycomb. That is, a state of honeycomb weight equilibrium is achieved such that further exposure to the humid atmosphere under the treatment conditions described does not result in further water adsorption or an appreciable weight gain by the honeycomb.

The honeycomb thus treated is next catalyzed by immersion in an aqueous acid catalyst solution of cobalt carbonate, ammonium heptamolybdate, and phosphoric acid of the same composition found to induce cracking in untreated alumina honeycombs as described above. In the course of this treatment it is confirmed that even prolonged immersion of the honeycomb in the catalyst salt solution does not induce cracking of the honeycomb. In fact, repeated catalyst deposition treatments such as described can be carried out, with drying after each immersion to remove liquid water from the honeycomb channel structure, without cracking and without any need to subject the honeycombs to water vapor treatments between each catalyzation cycle.

Surprisingly, it is determined that the vapor pre-treatment employed above does not interfere in any material way with the adsorption of catalyst precursor salts into the pore structure of the honeycombs. Thus catalyst loadings that are substantially equivalent to those achieved through similar treatments of water-free calcined honeycombs are achieved.

EXAMPLE 2

An alumina honeycomb prepared as above described is treated in a humid atmosphere in accordance with the procedure of Example 1 above to achieve honeycomb weight equilibrium in the presence of water vapor. The treated honeycomb is then subjected to a vacuum impregnation to deposit a catalyst thereon, the purpose of the vacuum impregnation being to increase catalyst solution penetration into the fine pore structure of the alumina honeycomb.

The vacuum catalyzation treatment employed comprises placing the vapor-treated honeycomb in a vacuum immersion chamber, reducing the chamber pressure to a value in the milli-torr pressure range to evacuate most of the air from the pores of alumina honeycomb, and then immersing the honeycomb under vacuum into an aqueous acidic cobalt-molybdenum catalyst salt solution as above described to obtain a high degree of solution penetration into the pore structure of the honeycomb.

Following this immersion, air is re-admitted to the chamber and the solution-treated honeycomb is removed and examined. No evidence of honeycomb cracking is found. Instead, it appears that the water adsorbed into the pore structure of the honeycomb during the vapor pre-treatment is sufficiently bound to that structure to remain adsorbed to a substantial degree under the applied vacuum.

The degree of water adsorption remaining is apparently sufficient to maintain a level of protection for the honeycomb that is effective to prevent honeycomb cracking throughout the subsequent liquid immersion. Again, repeated honeycomb drying and liquid immersion can be carried out on the honeycomb without the need to repeat the vapor pre-treatment.

Of course, the foregoing examples are merely illustrative of the invention and it will be apparent that numerous modifications and adaptations of the particular materials, practices and procedures hereinabove described may be resorted to for the purpose of securing the various advantages of the invention within the scope of the appended claims.

We claim:

1. A method for treating an alumina honeycomb to disperse a catalyst constituent on honeycomb channel surfaces thereof which comprises the steps of:
    (a) exposing substantially water-free alumina honeycomb to water vapor for a time sufficient to develop a crack-inhibiting deposit of adsorbed water within the pore structure of the honeycomb; and thereafter
    (b) contacting the honeycomb with an aqueous liquid medium containing the catalyst constituent.

2. A method in accordance with claim 1 wherein the step of exposing the honeycomb to water vapor comprises exposing the honeycomb to a moist air atmosphere of at least 50% relative humidity at a temperature in the range of 25–100° C.

3. A method in accordance with claim 2 wherein the step of exposing the honeycomb is carried out for a time sufficient to bring the honeycomb into weight equilibrium in the presence of the moist atmosphere.

4. A method for protecting a calcined alumina honeycomb from damage through liquid water contact which comprises exposing the honeycomb to water vapor at a temperature and for a time sufficient to develop a crack-inhibiting deposit of adsorbed water within the pore structure of the honeycomb prior to the liquid water contact.

\* \* \* \* \*